(12) United States Patent
Skourup et al.

(10) Patent No.: US 7,715,929 B2
(45) Date of Patent: May 11, 2010

(54) HUMAN-MACHINE INTERFACE FOR A CONTROL SYSTEM

(75) Inventors: Charlotte Skourup, Drammen (NO); John Pretlove, Sandvika (NO); Kristoffer Husoy, Haslum (NO)

(73) Assignee: ABB Research Ltd., Zürich (CH)

( * ) Notice: Subject to any disclaimer, the term of this patent is extended or adjusted under 35 U.S.C. 154(b) by 0 days.

(21) Appl. No.: 11/392,664

(22) Filed: Mar. 30, 2006

(65) Prior Publication Data

US 2006/0241793 A1      Oct. 26, 2006

Related U.S. Application Data

(60) Provisional application No. 60/667,080, filed on Apr. 1, 2005.

(51) Int. Cl.
*G05B 15/02* (2006.01)
*G05B 13/01* (2006.01)
*G05B 15/00* (2006.01)
*G05B 23/02* (2006.01)
*G06F 3/048* (2006.01)

(52) U.S. Cl. ............................... 700/17; 700/9; 700/83; 340/3.1; 715/757; 715/848

(58) Field of Classification Search .................. 700/17, 700/83, 9; 340/3.1; 715/757, 848
See application file for complete search history.

(56) References Cited

U.S. PATENT DOCUMENTS

| | | | |
|---|---|---|---|
| 5,032,978 A | 7/1991 | Watson et al. | |
| 6,718,215 B2* | 4/2004 | Friedrich et al. | 700/65 |
| 6,889,096 B2* | 5/2005 | Spriggs et al. | 700/17 |
| 6,892,107 B2* | 5/2005 | Baba et al. | 700/108 |
| 7,092,771 B2* | 8/2006 | Retlich et al. | 700/72 |
| 2002/0075244 A1* | 6/2002 | Tani et al. | 345/173 |
| 2004/0098148 A1* | 5/2004 | Retlich et al. | 700/83 |
| 2007/0179641 A1* | 8/2007 | Lucas et al. | 700/83 |
| 2009/0210071 A1* | 8/2009 | Agrusa et al. | 700/9 |

\* cited by examiner

*Primary Examiner*—Ronald D Hartman, Jr.
(74) *Attorney, Agent, or Firm*—Venable LLP; Eric J. Franklin

(57) ABSTRACT

A human-machine interface of a control system for monitoring and control of a process and including a computer generated model of the process. The process or a part or component of the process is displayed such that the model is arranged to map a point on the computer generated model to data held by the control system about the at least one part or component of the process. A method to monitor and control a process using the human-machine interface and a system including the interface are also described.

47 Claims, 5 Drawing Sheets

1  4  2  5a 1  30  2'

1  31  9  30  34  32  33  5a 31  30  32  33  5b

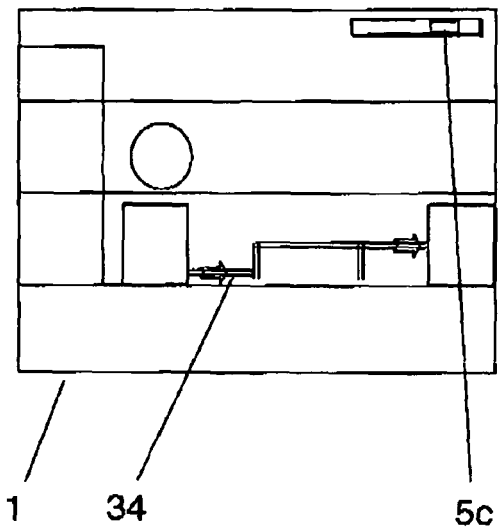
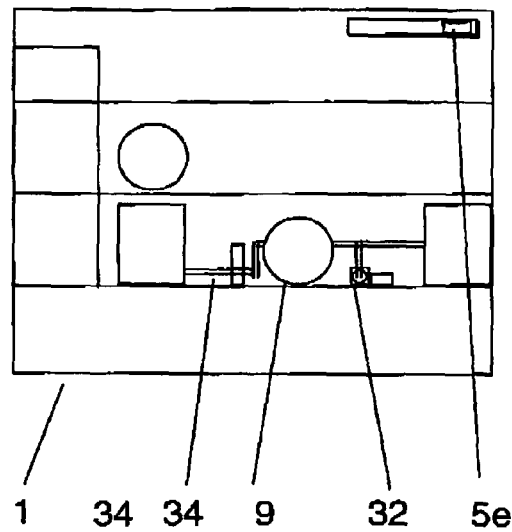
1   34                    5c
Fig 3b
1   34 34   9    32   5e
Fig 3c
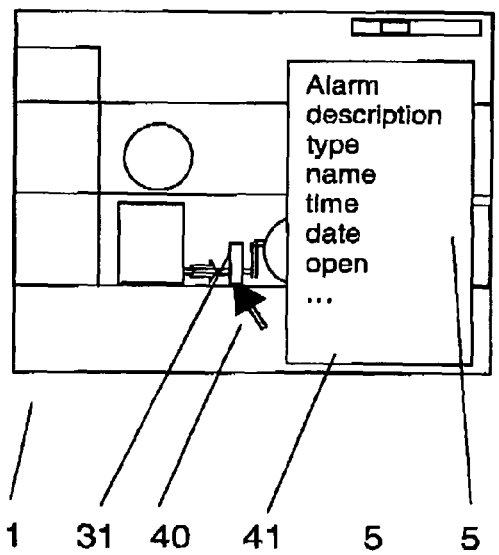
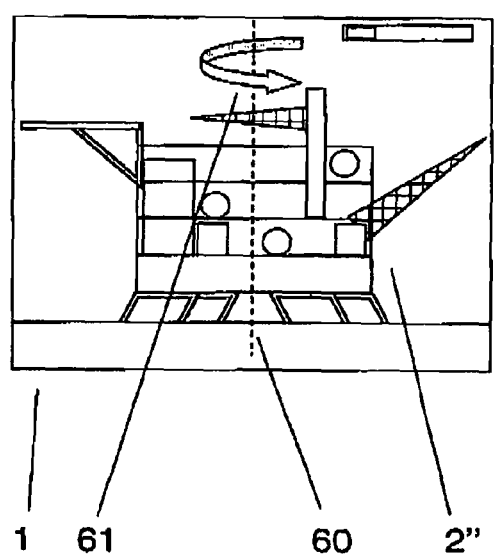
1  31  40   41   5   5
Fig 4
1   61      60    2"
Fig 5

HUMAN-MACHINE INTERFACE FOR A CONTROL SYSTEM

CROSS-REFERENCE TO RELATED APPLICATIONS

This application claims priority to U.S. provisional patent application 60/667,080 filed 1 Apr. 2005.

TECHNICAL FIELD

The present invention concerns a human machine interface for a system for control and/or monitoring of an industrial process, automated equipment or a device. The invention may be applied in many fields such as oil and gas, electricity generation, transmission, distribution as well as in industry. The invention may be applied to monitoring, control and/or programming of an industrial robot for robotic and automated applications.

BACKGROUND ART

A technician or a field operator, e.g. in a process plant, manufacturing installation, at off-shore oil and gas platform or at an electrical power transmission or distribution installation or substation, needs to check on alarms and other events reported by a control system, as well as interact with systems or devices in the installed equipment on a daily basis. An operator also has to have access to information and documentation about the process(es) and the installed equipment. However various user interfaces, both physical and software interfaces, for the installed equipment, operating devices and for one or more supervisory control systems and so on are often designed differently so that the field operators have to learn how to use a multitude of different user interfaces. The different equipment interfaces may also often be inconsistent with respect to each other.

U.S. Pat. No. 5,032,978 to Westinghouse, entitled Status tree monitoring and display system describes a display, a display method and an apparatus are disclosed which produce a summary display depicting function states using discrete state bars centered in one window of a two-window display. The display is presented to solve a problem that in many complex processes, the operator is confronted with a vast amount of information that must be analyzed before appropriate action can be taken.

The field operator, as well as interacting with installed equipment or devices or systems, needs access to documentation of some kind, which may be a manual, historical data, maintenance history & repair reports and the like. Even though the trend is that parts of such documentation has become electronically available, it is often stored in different systems and at different locations. Therefore, the field operators either have to plan information gathering for their work tasks in advance, or they have to interrupt ongoing tasks in order to find and then access support information and documentation for the installed equipment, process or device. In addition, the process of obtaining information about an alarm or about a device may take considerable time, and may require that an operator browses through many databases. A considerable amount of time may be necessary to search by name or system identification for information about a device or process. In critical or emergency situations, it is very important to obtain relevant technical information quickly to avoid material damage to plant to process as well as possible injury to persons in the plant.

SUMMARY OF THE INVENTION

A primary aim of the present invention is to provide human-machine interface of a control system for monitoring and control of a process, comprising a computer generated model of the process displaying said process or a part or component of said process wherein in that said model is a 2-D or 3-D model which is arranged to map from a point on the computer generated model to data held by said control system about the selected at least one part or component of said process control an industrial automation process.

A secondary aim of the present invention is to provide graphic information manipulate-able by an operator to retrieve, examine and use in direct relation to a specific equipment and/or device or equipment, plant or process by means of selecting and/or activating a point on a 2-D or 3-D model of the process, which point is mappable via setpoints watchpoints or other data points to execute an instruction to retrieve technical information. Another aim is to provide additional information in the form of graphic information manipulateable by an operator to access, examine and/or carry out control actions for a specific equipment, plant, device or process.

The above and more aims are achieved according to the invention by a human machine interface and a system according to embodiments of the present invention.

According to a first aspect of the invention, a human machine interface of a control system for monitoring and control of a process or equipment, comprising a computer generated model of the process displayed, is described. Information, data and/or instructions for the process or a part or component of said process are provided by manipulating the HMI 2-D or 3-D model. Special points, setpoints or watchpoints in the model are mapped to the control system. The operator activates or selects a device and can retrieve technical information, send an instruction, monitor or configure that device via the interface provided by the 3-D or 3-D graphic model.

According to a second aspect of the invention, a human machine interface of a control system for monitoring and control of a process, comprising a computer generated model of the process displaying said process or a part or component of said process is described for displaying the control system information to one or more remotely located experts for further interaction via the HMI, and for further interaction with an original user or operator.

According to a third aspect of the invention, a human machine interface of a control system for monitoring and control of a process, comprising a computer generated model of the process displaying said process or a part or component of said process which generated display information the operator may use to guide him/her through the plant or process to a specific location of the specific equipment by means of a 2-D model of the plant or layout, and/or by means of a 3-D model.

The general aim of this invention is to provide a fast and efficient way to locate specific process or equipment control data held by a control system. The user points to the valve or mixer or press on the model and is routed to the control system information held for that part or device. Online real time data, setpoints, configuration data, service history, any information associated with that device by the control system may be intuitively found and then retrieved. The information obtained may be displayed to a field operator (e.g. an operator, a service technician, a maintenance person, OEM, a process engineer, etc. or to a remote person, expert, other operator etc. First of all, the HMI and the described methods provide relevant information intuitively and quickly to the field operator for monitoring and interaction with the industrial process or device.

The HMI and system herein is described below in detail with respect to an oil and gas platform. The HMI described may be used to interface with the control system for other processes, or productions processes or automated equipment. Brief examples in the form of scenarios for use of the HMI will now be described.

Service Team Performs Maintenance on Platform

Task: Service team receives assistance and guidance by control room operators

Industry: Oil & Gas

When the control room can visualize both plant and process as a 3D model, both service personnel and control room operators can get detailed, local information about locations, equipment and components. This provides service personnel with improved and more efficient guidance and assistance from control room operators. The exact position of the service team can be viewed by control room operators, and a direct communication link with document sharing, video and sound can be used to transmit information. The control room operators can issue work orders to the service team that is closest to the equipment and the work order can be discussed similar to if they were co-located. The control room personnel can access a 3D model with graphical representations of the service team, real-time process information, historical databases, maintenance records, procedure descriptions or manuals and thereby provide better assistance and guidance to service teams.

Design and Planning an Upgrade of the Plant

Task: Visualize and simulate operation and integration of new system

Industry: Process industry

There are often spatial constraints and compatibility issues when upgrading or changing process equipment. If the control room has access to and maintains an updated version of a 3D model of the process and plant, this can be used for planning an upgrade and for examining tenders. The 3D model can be examined with and without the suggested upgrade, and feasibility, compatibility and spatial issues can be discussed and examined visually. Both overall compatibility and detail-specific issues can be examined by zooming/abstraction and by interacting with the virtual model.

Process Control Engineers Aid Field Operators

Task: Improve process performance at component level

Industry: Process industry

Access to a 3D model with advanced interaction possibilities can help process control engineers in communicating with field operators, control room operators, subcontractors and other involved parties.

Operators in Control Room Supervise Field Operators

Task: Supervise field operators, assist and issue work orders when necessary

Industry: Process industry

The presence of field operators and other personnel on the plant floor is often perceived as a stress factor for control room operators. This is because the control room operators do not know the exact position and status of these people and direct communication is not always possible. A 3D model of the plant with avatars representing the exact position of all personnel can reduce this stress. Furthermore, advanced information and communication technology can establish efficient multi-modal communication channels quickly. The 3D model of the plant can also aid operators in assisting personnel on the plant floor or when communicating with external or remote experts. The 3D model can give detailed information about the immediate surroundings of the field operator that needs assistance, for example by highlighting the electric system, pipelines, valves, pumps or other relevant components.

Production Managers Ensuring High Process Performance

Task: Identify bottlenecks and inefficiencies in current production system

Industry: Oil & Gas

A 3D model of plant and process equipment can aid in understanding deficiencies or sub-optimal performance when examining the current process. By highlighting the equipment directly related to the process at hand, e.g. by making the rest of the 3D model transparent and coding performance levels into different colors, can be used to understand the situation and identify bottlenecks. This is also an efficient method for communicating and discussing solutions between process control engineers, control room and field operators, production managers, and other involved parties.

Electrification and a Planned Maintenance or Upgrade of Electrical System on a Platform Task: Plan re-routing of electrical system around section to be upgraded Industry: Oil & Gas Control room operators and service team meet and plan the upcoming maintenance work on the electric system for a section of the plant. The 3D model of the platform displays the electric circuitry with the relevant power generators in a (semi-) transparent view of the platform. The possible re-routings can be displayed and the impact can be examined visually for each possibility and all actors can interact with the model to highlight important areas or features directly. This creates a simple and unambiguous foundation for discussion and decision-making.

Safety and a Periodical Safety Check of all Valves

Task: Control room operators perform safety check of all valves

Industry: Process industry

Emergency Teams and a Fire on a Floor of the Plant

Task: Assess situation and plan rescue strategy with emergency team

Industry: Process industry

When a fire occurs on the plant floor, the firefighters, ambulance and rescue teams need to be informed of information such as: the exact location of the fire and of any personnel, any dangerous leakages, spills or possible can happen, and how to access these areas. Such information can be presented most efficiently by a 3D model of the plant, and/or a 2-D model. A 2-D model that graphically visualises the floor layout for a given production floor and indicates, with for example flashing arrow signs overlaid on the floor of the layout plan, the route to the nearest fire exit. Such a model provides information that may be understood even in the stress of an emergency situation, without any necessity for the viewer to understand or even read text. The control room, because of the HMI and because of its access to technical process information, can also function as a temporary emergency centre where the emergency teams can get information and also discuss possible solutions or rescue strategies with operators or engineers.

Authorities Make a Safety Inspection, e.g. the Railroad Inspectorate

Task: Authorities inspect situation at complex multi-track rail stations

Industry: Railroad

When the proper railroad authorities inspect safety and efficiency considerations of the railroad system, a 3D model and/or 2-D model can be an efficient means for communication and discussion. There are severe restrictions on how trains can change tracks and move about on the track system, and in large station areas the situation can be very complex and difficult to grasp. A 3D model of the tracks and trains can be used to visualize how the trains move between the tracks and to ensure all regulations are followed. Certain laws, conditions and restrictions can also be visualized directly in the model, e.g. how much space or time must pass between two consecutive trains, between two trains on intersecting tracks, and so on. In certain circumstances 2-D models may also be used.

In addition, further and advantageous aspects of the invention are described in relation to a graphical user interface, a computer program for implementing the method and a computer program product including the computer program.

BRIEF DESCRIPTION OF THE DRAWINGS

Embodiments of the invention will now be described, by way of example only, with particular reference to the accompanying drawings in which:

FIGS. 3a, 3b and 3c are schematic representations of a display of a human machine interface, each diagram showing a display of one or more selected layers of information according to a third embodiment of the invention;

FIG. 4 a schematic representation of a display of a human machine interface showing a display of a group of operational or functional data selectable for a selected one or more component parts of the process according to another embodiment of the invention;

FIG. 5 is a display of a human machine interface showing a part of the HMI display being arranged rotatable about an axis according to another embodiment of the invention;

DETAILED DESCRIPTION OF THE EMBODIMENTS

Figure 1A:
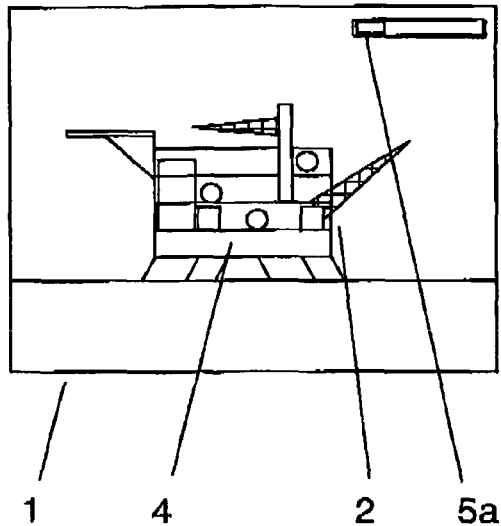
FIGS. 1a and 1b are a schematic representations of a display of a human machine interface for monitoring and controlling a process, the example shown being of an oil production platform according to an embodiment of the invention.
Figure 1B:
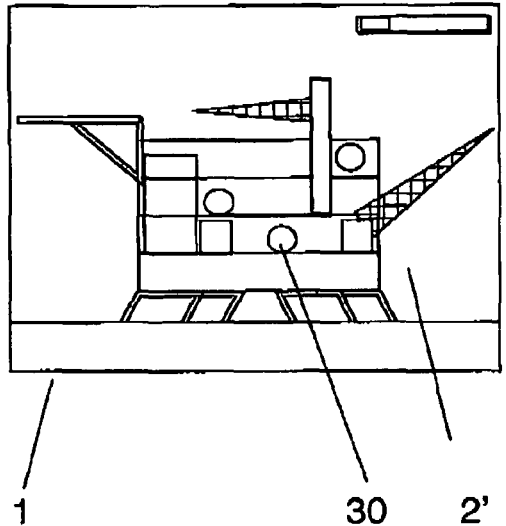
Figure 2:
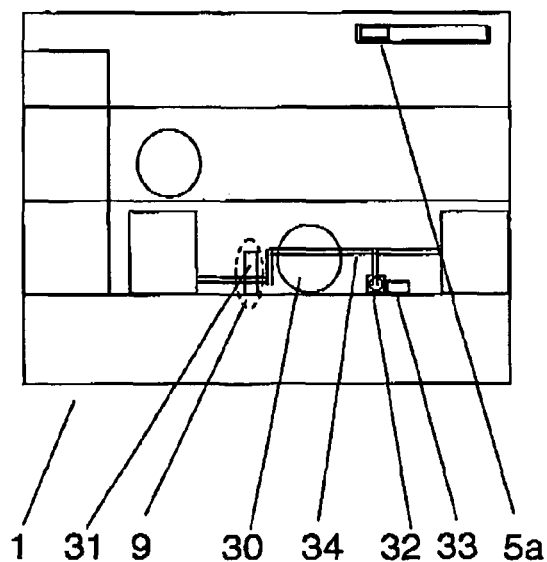
FIG. 2 is a schematic representation of a display of a human machine interface showing a close up and an alarm state according to another embodiment of the invention.

FIG. 1a shows display of an oil platform, a process for production or exploration etc for oil and gas. The display 1 comprises an oil platform 2, with one or more production areas 4, and a selection menu 5a. The display in this example is a 3-D model of an oil platform. The 3-D model displayed is a computer generated model that may be manipulated so that the oil platform may be viewed from different angles and at different resolutions or magnifications. FIG. 1b shows a close up view of the same model of the oil platform 2, and FIG. 2 shows a close up of process equipment on a part of the oil platform. FIG. 5 shows schematically that the 3-d model is rotatable, for example about an axis 60 in a direction indicated by arrow 60.

The process equipment of the oil platform is monitored and controlled by a control system. The control system comprises information about the process, each stage of the process, and each separate equipment in the process. The information, real time, historic and documentation is stored accessible from the control system.

FIG. 2 shows a display comprising the selection menu 5a, a tank 30, associated piping 34, a pump 33, a pump motor 32 and a pressuriser 31. Pressuriser 31 is shown to be marked in a particular way 9 shown here by a dashed ring. The image of pressuriser 32 is caused to flash and change colour, as suggested in the Figure by ring 9, representing by this feature of the 3-d model that an alarm about the pressuriser has been logged by the control system.

Figure 6:
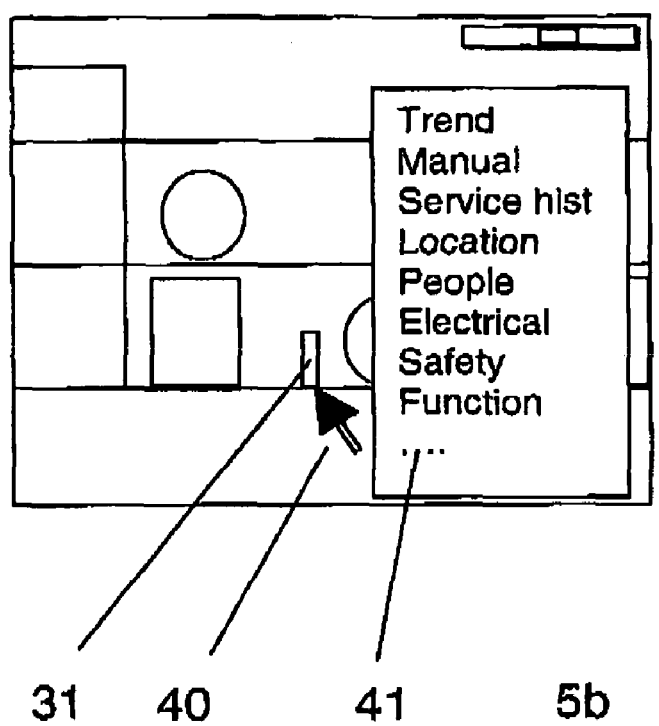
FIG. 6 is a display of a human machine interface showing operational facets of a device that are linked to data stored in a control about the selected one or more component parts of the process.

Such an alarm in a process may be handled as follows. A specialist or expert on the oil platform process has a display of the model showing the oil platform, as shown in FIG. 1a, 1b or 6 etc. The display be a Macro view of the model of the oil platform rotating, thus showing a fly-around.

An alarm is signaled visually on the display and/or by a sound signal; and the display automatically zooms-in through the 3D model to the specific device/location of the alarm. The expert selects to view the alarm description which has been logged by the software of the control system, which is further associated with control system software entities for the and each specific device (for example a pop-up view when the expert right-clicks the image of the device 31). FIG. 6 shows a display 1 zoomed-in to the process equipment including pressuriser 31, and a computer pointer device 40, a pop-up list 41 for the pressuriser. The pop up list preferably contains a description of the alarm, title, device, nature of alarm, most recent occurrence, and so on. A similar method of use of the HMI is shown as a flowchart in FIG. 7.

Figure 3A:
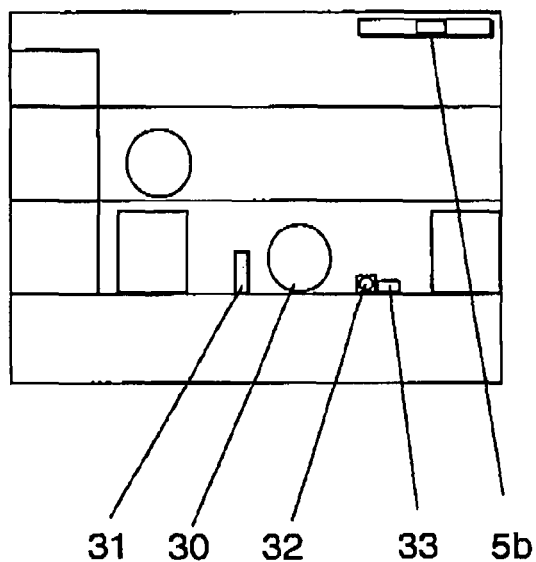

FIG. 3a shows a display of the process section of the oil platform in which process equipment pressuriser 31, pump 32 are shown, but the associated electrical system or piping is not shown. FIG. 3b shows a display of the process section of the oil platform in which the piping 34 is shown, but some types of process equipment are not shown. The expert selects two additional visualisation layers each in turn, piping 34 FIG. 3b and components 31 etc in the 3-D model. By examining the information presented about the electrical, piping etc systems the expert can rapidly identify what has happened to cause the alarm, and what, if anything, ought to be done about it now or later.

FIG. 6 shows schematically a device, pressuriser 31, the computer pointer marker 40, and a group of operational facets stored in the control system and associated with the pressuriser 31 that have been selected, so that the pop-up 41 is displayed. The expert selects eg right-clicks etc on different objects such as pressuriser 31, which results in activating a link or address so that associated device-relative information such as trend curves, user manual, service history (e.g. from 800xA, a SAP, a SCADA system, physical location, process location, electrical schema, piping schema etc.) is available for viewing or retrieval. The expert selects a visualisation layer, for example People, and selects a field operator located close to the pressuriser. He opens a communication channel, such as by picking up a phone, and a connection is set up automatically to the field operator.

Figure 7:
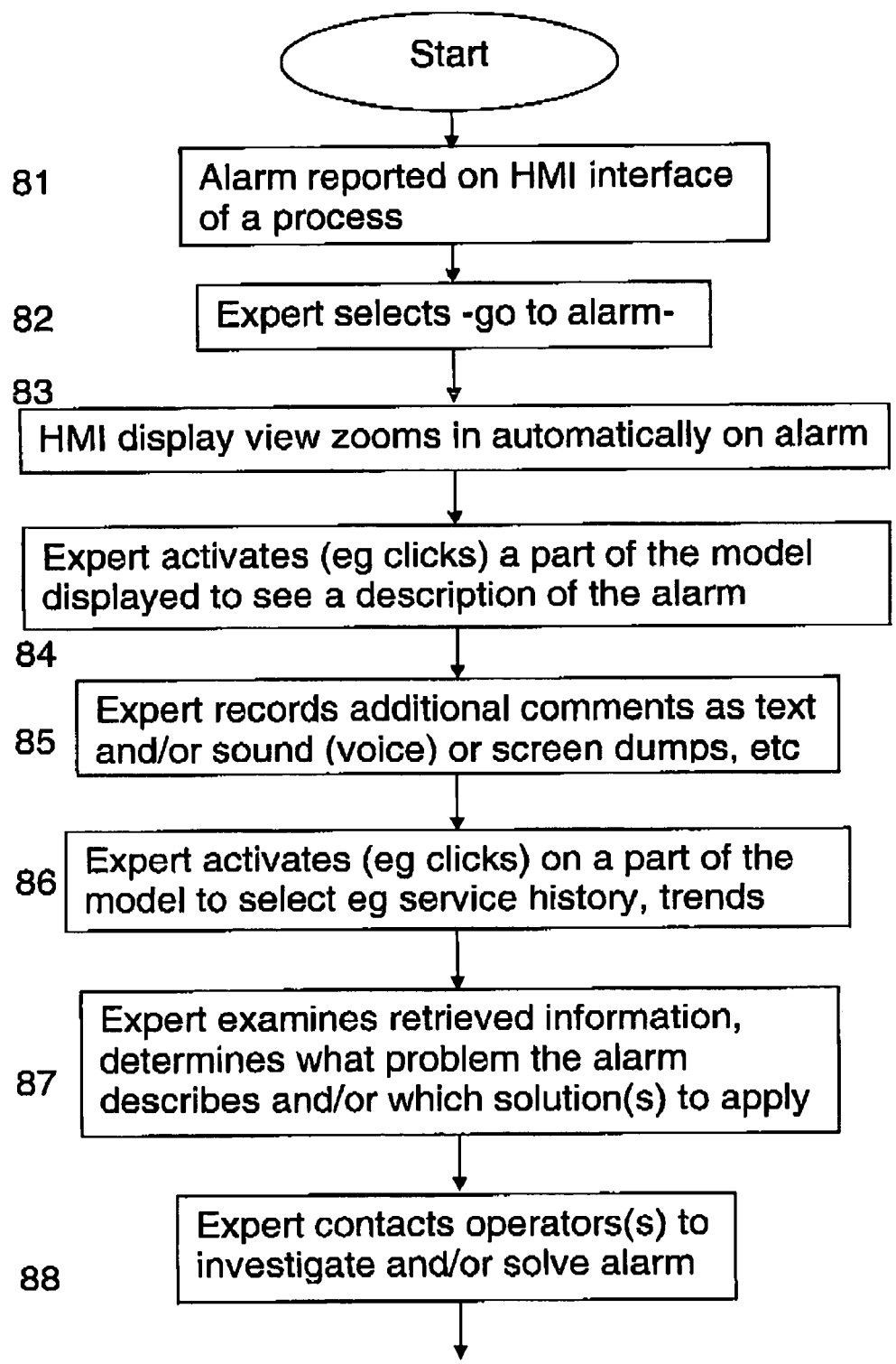
FIG. 7 is a schematic flowchart for a method to handle an alarm using the HMI to control and monitor a process according to an embodiment of the invention.

Thus an expert or other qualified user may access information rapidly via the interface comprising the model. The user may as described above in relation to FIGS. 3*a*, *b*, and *c*, add a layer of information or remove a layer of information, in order to examine the context of a device or process or of an alarm or other event from the device etc. FIG. 7 shows in flowchart form how a specialist or expert may use the interface to examine an alarm and gather current and/or historic technical information relevant to the alarm.

FIG. 7 shows then a flowchart wherein an alarm is reported 81 on the display of HMI, an expert (or other user) selects to go to 82 the alarm and the HMI can automatically zoom in 83 on the part of the process where the alarm has come from. The expert can retrieve further information about the alarm by clicking on the alarm 84. The expert can record comments, 85 text, video clip, animation clip, voice etc via the HMI. The expert may then access more information about the process part or device related to the alarm to obtain service history 86, trends, performance data, production data, manuals, other documentation and so on. The expert may then with access to any of the information in the control system that is associated with the process alarm or device alarm make a judgement 87 and then, for example contact staff on site 88 or remote to investigate or otherwise act.

Figure 8:
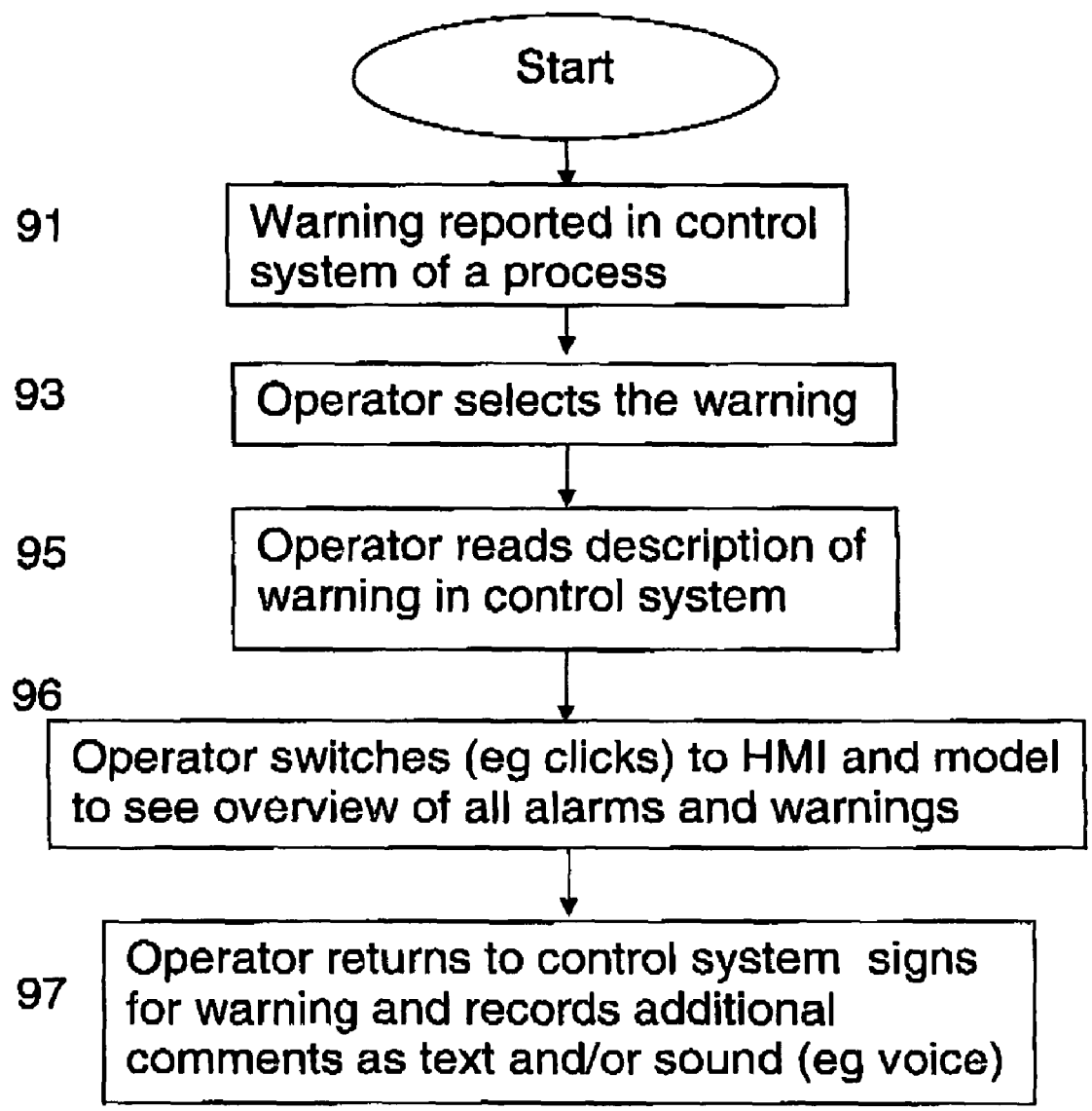
FIG. 8 is a schematic flowchart for another use of the HMI to control and monitor a process.

FIG. 8 is a flowchart showing another use of the HMI. An operator may switch from the process control system to the HMI. For example as summarised, an operator gets a warning 91 on the control system. The operator reads the warning 95, and will obtain additional technical data. The operator switches 96 to the HMI and model and gathers, for example, an overview of other active alarms and events. After examining the other information on current events, the operator may return to the control system 97, signs off that he/she has noted the warning, and records text, voice or other comments in the record for that component.

A 3-D model may be based on one or more CAD drawings of the plant or process. A 3-D or 2-D model may be based in part on electrical, piping or wiring schemas or layouts. A 3D or 2-D model is preferably layered, such that layers of information may be added or stripped. Such layers may represent functional groupings such as electrical schemas, process flow, physical location, utilities and services (air, water) flow and so on. The model may be arranged for computer control for operations such as fly through, spinning, 3D viewing, zooming. The 3-D model is somewhat related to the computer generated virtual reality developments, but applied to solving industrial problems.

Data points in the 3-D or 2-D model are associated with devices, sensors, nodes and so on that are connected to or otherwise controlled by one or more control systems. The association may be arranged within one or more computer programs by using setpoints, by monitoring watchpoints, or by other means. The data may be arranged based on wireframe data constructs with or without surface rendering techniques.

One or more microprocessors (or processors or computers) comprise a central processing unit CPU performing the functions of the HMI and/or steps of the methods according to one or more aspects of the invention. This is performed with the aid of one or more computer programs, which are stored at least in part in memory accessible by the one or more processors. It is to be understood that the computer programs carrying out methods according to the invention may also be run on one or more general purpose industrial microprocessors or computers, or on one or more specially adapted computers or processors, FPGAs (field programmable gate arrays) or ASICs (application specific integrated circuits) or other devices such as simple programmable logic devices (SPLDs), complex programmable logic devices (CPLDs), field programmable system chips (FPSCs). The computer programs described may also be arranged in part as a distributed application capable of running on several different computers or computer systems at more or less the same time.

A part of the program may be stored in a processor as above, but also in a ROM, RAM, PROM, EPROM or EEPROM chip or similar memory means. The program in part or in whole may also be stored locally (or centrally) on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as Sony Memory Stick® and other removable flash memories used in digital cameras etc, phones, or removable hard drives etc. may also be used. The program may also in part be supplied from a data network 10, which may in part or temporarily comprise a public network such as the Internet.

In a further preferred embodiment, structured text documents are used to link or provide references to the objects and control objects of the interface to objects and control objects held by the control system. It is necessary to connect 3D operator interfaces of the models to the control system objects, such that the 3D interface can be updated with real-time information from the process plant (e.g. the 3D model-part representing the object starts blinking when the object is in an alarm situation). For this to be possible, there must be a link between the control system objects (such as the real-time measurements from the distributed control system) and the 3D objects. It is important to find good methods for configuring 3D interfaces, otherwise the engineering phase will be much too costly because every single control system object must be connected to a 3D representation in addition to the 2D representation, hence to make each link or reference by means of a manual configuration would increase the current engineering effort to a great extent.

Configuring the interfaces automatically can be done by using a structured text format (such as xml, extended xml, caex, other industry accepted XML extensions) to connect the objects in a 3D model of the plant to the corresponding objects in the control system.

This is especially advantageous for those cases where part of the engineering is done in CAD-programs. In these cases there is an existing 3D model of the plant. Such 3D model or models can either be used directly or be used as reference for a 3D model that can be at used run-time. Both the linkage between 3D objects and control system objects as well as the location and orientation of each piece of equipment can be automatically entered into the structured text format from these models. Thus the information stored in the structured text format can be populated automatically from engineering tools. Another advantage of use of structured text to link 3D models to control object information is that it reduces the time and cost of configuring a system. Another advantage is that manual input errors associated with manually configuring links to the 3D model are eliminated.

In another preferred embodiment, controls for the CCTV systems commonly used in some industrial installations, such as oil and gas plants, may be integrated into the industrial control system. Thus it may be efficiently arranged to access a CCTV system and display pictures and video images for an equipment, object or location by arranged the CCTV system as integrated into the industrial control system. Thus by operating a control means of the human machine interface or the 3D model described above, images from the CCTV system of an equipment, object or location selected via the HMI or 3D model may be displayed: and/or CCTV or other cameras may be controlled by manipulating the 3D representation of the plant.

In other words, the 2D and 3D interfaces in control rooms can also be used to control the video streams that are already available. There are currently several sources of video streams that are presented in the control room, and even more that will be available in the future. A known example is Closed Circuit TV (CCTV), which means video cameras that are distributed throughout the plant for surveillance and overview purposes. Another example is wearable cameras that the field operators use in the field for improved communication with control room operators and remote experts. These video streams can be called up to view by selecting an object in the 3D or 2D interface and, for example, choosing to "View live video" of this object. This operation automatically selects the camera that can present this object (or alternatively, the best view if many cameras can view the object) and then manoeuvre this camera so that the chosen object is in view. For example when an operator right-clicks an object in a process graphic he/she can choose to "view object in camera", which automatically presents a view of the object on a monitor. This involves an automatic system for selecting which camera can be used to view the selected object (or which has the best view) and then maneuvering the camera (pan/tilt/zoom) so the selected object is shown in view. Current CCTV systems have separate HMIs (most commonly these are separate hardware panels) from the rest of the control room equipment. This occupies a lot of physical space in control rooms, is costly to develop, install and maintain, and it is difficult for operators to learn and handle many different HMIs and systems in time-critical situations.

Traditional CCTV systems have separate HMIs (most commonly dedicated hardware panels) from the rest of the control room equipment. The hardware panels interfaces occupy a lot of physical space in control rooms, are costly to develop, install and maintain, and it is difficult for operators to learn and handle many different HMIs and systems in time-critical situations. Furthermore, the interaction with the cameras requires a great deal of knowledge of plant layout by the operator. When an operator wants to view a specific peace of equipment or a plant area, she must first select which camera to use, then she must know the plant good enough to guide the camera to the correct pan/tilt/zoom setting to get the equipment into view. This is often done by a joystick-type control.

The limited effectiveness of known CCTV systems is a similar situation to that of the known audio systems. Today, control room operators, field operators, back-office personnel, remote experts and administrative personnel can communicate orally through telephone, mobile phones, UHF/VHF Radio systems and Public Address and Alarm (PA & A) systems.

In another further preferred embodiment, such known audio system or systems in an industrial or oil and gas installation can be connected to the control system and the 3D representation, such that these audio systems can be controlled by manipulating the 3D representation of the plant. Examples of such use can be to automatically dial a field operator by clicking on the avatar or symbol representing the operator in the 3D or 2D interface (and also selecting the preferred communication means if more than one is possible). Furthermore, the operator can also select directly in the 3D interface which areas to dispatch a message over the PA & A system to. This can be very effective and powerful when combined with a 3D representation of a gas leakage, for example.

In such a situation, information about which gas detectors have gone into alarm state combined with knowledge of escape routes and possibly also metrological information can be used to select which areas should be notified with the alarm warning message. An advantage of generating this information from other (non audio) information accessed by the HMI or 3D model is that an operator may activate communications such as UHF/VHF transmissions or loudspeaker announcements for selected areas of the plant by the alarm or event affected without having to have extensive or detailed location knowledge beforehand.

It should be noted that while the above describes exemplifying embodiments of the invention, there are several variations and modifications which may be made to the disclosed solution without departing from the scope of the present invention as defined in the appended claims.

We claim:

1. A human-machine interface of a control system for monitoring and control of a process, comprising:
    a three-dimensional computer generated model of equipment, plant, or device for carrying out said process or a part or component of said process, wherein said model maps a point on the computer generated model to data held by said control system about the equipment, plant, or device or at least one part or component of said process, said model comprising graphic information manipulatable by an operator to retrieve, examine and use in direct relation to the equipment, plant, device or process by selecting a point on the model, which point is mappable via setpoints watchpoints or other data points to execute an instruction to retrieve technical information, provide additional information in the form of graphic information manipulatable by an operator to access, examine and carry out control actions for the equipment, plant, device or process, the model comprising a plurality of selectively displayed layers superimposed on the three-dimensional model, the layers comprising information regarding elements of the equipment, plant, device or process, said elements of said layers being displayed in a position in said model corresponding to a physical location of the respective elements, wherein the operator may zoom into and out of the model or alter an orientation of the model.

2. The interface according to claim 1, wherein said model is arranged for manipulation by computer software elements to change a shape of a displayed image and generate a change in an orientation of one or more selected parts of said model so displayed.

3. The interface according to claim 1, wherein said model is arranged for manipulation by computer software elements to change a shape of a displayed image and rotate said model or selected parts of said model about at least one axis.

4. The interface according to claim 1, wherein said model is arranged for manipulation by computer software elements to change a shape of a displayed image and change the scale of the one or more parts of said model so displayed.

5. The interface according to claim 1, wherein said model is changeable with computer software elements to present a visual display comprising a zoom-in on, and/or zoom-out from, one or more parts of said model so displayed.

6. The interface according to claim 1, wherein said model is arranged with computer software elements to display, show or superimpose technical data or information from any part of said process on the display of the one or more parts of said model.

7. The interface according to claim 6, wherein said model is arranged with computer software elements to provide an active link for accessing or retrieving technical data or information about one or more selected parts or components of said process displayed by said model.

8. The interface according to claim 1, wherein said model is arranged with computer software elements to provide an active link for accessing or retrieving technical data or real time information about a technical function of one or more selected parts or components of said process.

9. The interface according to claim 8, wherein one or more graphic components of said model are arranged with computer software elements for displaying a plurality of groups of technical information grouped relevant to a selected function, location or other operational facet or of a selected graphic component.

10. The interface according to claim 1, wherein said model is arranged with computer software elements to provide an active link for accessing or retrieving historical technical data or information about a technical function of one or more selected parts or components of said process so displayed.

11. The interface according to claim 1, wherein the one or more graphic components of said model are arranged with computer software elements for displaying technical information relevant to a selected function, location or other operational facet of the one or more parts of said process.

12. The interface according to claim 11, wherein the one or more graphic components of said model are arranged with computer software elements for displaying technical information relevant to a selected one or more components grouped into a plurality of functions, locations, and/or operational facets for the selected one or more parts of said process.

13. The interface according to claim 1, wherein said model is arranged for manipulation by computer software elements to so as to graphically change an orientation of one or more selected parts of said model.

14. The interface according to claim 13, wherein said model is arranged for manipulation by computer software elements to so as to graphically change both scale and orientation of one or more selected parts of said model.

15. The interface according to claim 14, wherein said model is arranged so as to graphically change both scale and orientation of one or more selected parts of said model at the same time.

16. The interface according to claim 14, wherein said model is arranged so as to change one or more selected parts of said model and display a moving image of said model in a mode of any from the list of: fly through, spinning, 3D viewing, zooming.

17. The interface according to claim 1, wherein said model is arranged displayed at least in part as a three dimensional representation of said process, arranged for manipulation by computer software elements to so as to graphically change an orientation of one or more selected parts of said model.

18. The interface according to claim 1, wherein said model is arranged for manipulation by computer software elements to superimpose a layer of information on top of a shape of one or more selected parts of said model.

19. The interface according to claim 1, wherein said model is arranged for manipulation by computer software elements to remove a layer of information from a shape of one or more selected parts of said model and display other information about said process.

20. The interface according to claim 1, wherein the computer generated model of said process provides and presents information in a control system of an oil or gas storage, treatment or process installation.

21. The interface according to claim 1, wherein the computer generated model of said process provides and presents information in a control system of an electrical generation, transmission or distribution installation.

22. A method to monitor and control a process using a human-machine interface for a system for monitoring and control, the method comprising:
producing a three-dimensional model of equipment, plant, or device for carrying out said process with at least one graphic element displaying one or more parts or components of said process, said model comprising graphic information manipulatable by an operator to retrieve, examine and use in direct relation to the equipment, plant, device or process, the model comprising a plurality of selectively displayed layers superimposed on the three-dimensional model, the layer comprising information regarding elements of the equipment, plant, device or process, said elements of said layers being displayed in a position in said model corresponding to a physical location of the respective elements, wherein the operator may zoom into and out of the model or alter an orientation of the model;
selecting a point on the model;
mapping the point or data point on the computer generated model to data held by said control system about the equipment, plant, or device or at least one part or component of said process; and
selecting or activating the point on the model to execute an instruction to retrieve technical information and to provide additional information in the form of graphic information manipulatable by an operator to access, examine or carry out control actions for a specific equipment, plant, device or process.

23. The method according to claim 22, further comprising:
presenting on a display retrieved technical information associated with a device or process displayed or represented by said graphic element.

24. The method according to claim 22, further comprising:
presenting for selection a group of information structures holding operational data about different facets of the at least one part or component of said process.

25. The method according to claim 22, further comprising:
presenting for selection a list of information sources structures holding real time or historic operational data about different facets of the at least one part or component of said process.

26. The method according to claim 22, further comprising:
presenting on the display information of a warning or alarm that has occurred in respect of the at least one part or component of said process.

27. The method according to claim 22, further comprising:
presenting on a display a selection element configured to receive and/or display a warning or alarm that has occupied in respect of the at least one part or component of said process.

28. The method according to claim 22, further comprising: manipulating the model to automatically display the at least one part or component of said process for which a warning or alarm has been signalled.

29. The method according to claim 22, further comprising: manipulating the model to automatically display the at least one part or component of said process for which a warning or alarm has been signalled.

30. The method according to claim 22, further comprising: manipulating the model to add or remove a layer of operational information associated with the at least one part or component of said process for which a warning or alarm has been signalled.

31. The method according to claim 30, further comprising: manipulating the model to add or remove a layer of operational information associated with the at least one part or component for any from the list of: electrical system, water/utility system, location of people, alarms, process materials, fire and/or gas leakages.

32. The method according to claim 30, further comprising: manipulating the model to display the at least one part or component utilizing any graphic operation or 3D modelling operation from the list of: fly through, spinning, 3D viewing, zooming.

33. A computer program product, comprising:
a computer readable medium; and
computer program instructions recorded on the computer readable medium and executable by a computer or processor to carry out a method comprising producing a three-dimensional model of equipment, plant, or device for carrying out said process with at least one graphic element displaying one or more parts or components of said process, said model comprising graphic information manipulatable by an operator to retrieve, examine and use in direct relation to the equipment, plant, device or process, the model comprising a plurality of selectively displayed layers superimposed on the three-dimensional model, the layers comprising information regarding elements of the equipment, plant, device or process, said elements of said layers being displayed in a position in said model corresponding to a physical location of the respective elements, wherein the operator may zoom into and out of the model or alter an orientation of the model, selecting a point on the model, mapping the point or data point on the computer generated model to data held by said control system about the equipment, plant, or device or at least one part or component of said process, and selecting or activating the point on the model to execute an instruction to retrieve technical information and to provide additional information in the form of graphic information manipulatable by an operator to access, examine or carry out control actions for the equipment, plant, device or process.

34. A control system comprising a human-machine interface of a control system for monitoring and control of a process, comprising:
a three-dimensional computer generated model of equipment, plant or device for carrying said process or a part or component of said process, the model comprising a plurality of selectively displayed layers superimposed on the three-dimensional model, the layers comprising information regarding elements of the equipment, plant, device or process, said elements of said layers being displayed in a position in said model corresponding to a physical location of the respective elements, wherein the operator may zoom into and out of the model or alter an orientation of the model, and
a computer comprising a Human Machine Interface comprising a model of said process arranged in that said model maps a point on the computer generated model to data held by said control system about the at least one part or component of said process, wherein said model comprises graphic information manipulatable by an operator to retrieve, examine and use in direct relation to the equipment, plant, device or process by selecting a point on the model, which point is mappable via setpoints watchpoints or other data points to execute an instruction to retrieve technical information, provide additional information in the form of graphic information manipulatable by an operator to access, examine or carry out control actions for the equipment, plant, device or process.

35. The control system according to claim 34, wherein the human-machine interface comprises a model of said process arranged to map known set points in the model to data held by said control system about the at least one part or component of said process.

36. The control system according to claim 34, wherein the human-machine interface may be displayed and/or manipulated using a portable and/or wearable computing device.

37. The control system according to claim 34, wherein known set points in the model are linked or referenced to data held by said control system about the at least one part or component of said process utilizing one or more structured text documents.

38. The control system according to claim 37, wherein the structured text documents link control system objects to 3D model representations and their physical position/orientation.

39. The control system according to claim 37, wherein at least one structured text document is generated automatically.

40. The control system according to claim 34, further comprising
a selector configured to select a part of a human-machine interface or 3D object and to display one or more visual or video images of a selected object.

41. The control system according to claim 40, further comprising
a control configured to control the video images from the control system.

42. The control system according to claim 41, wherein the control configured to control the video images from the control system comprises a control configured to remotely operate pan or tilt or zoom a camera.

43. The control system according to claim 34, further comprising
an access element configured to provide access to oral communication with an operator by selecting a symbol of the a human-machine interface or a 3D model control system.

44. The control system according to claim 43, further comprising
an access element configured to provide access to oral or audio communication in a given area of an installation by selecting or manipulating a symbol of the a human-machine interface or 3D model control system.

45. The control system according to claim 44, wherein the access element comprises oral or audio elements, Public Alarm & Address devices, and/or loudspeakers.

46. The control system according to claim 43, wherein the access element comprises a UHF/VHF radio or phone or portable phone.

47. A human-machine interface of a control system for monitoring and control of a process, comprising:
a display; and
a three-dimensional computer generated model of equipment, plant, or device for carrying out said process or a part or component of said process, the model being displayed on the display and comprising a plurality of selectively displayed layers superimposed on the three-dimensional model, the layers comprising information regarding elements of the equipment, plant, device or process, said elements of said layers being displayed in a position in said model corresponding to a physical location of the respective elements, wherein the operator may zoom into and out of the model or alter an orientation of the model, wherein said model maps a point on the computer generated model to data held by said control system about the equipment, plant or device or at least one part or component of said process, wherein said model comprises graphic information manipulatable by an operator to retrieve, examine and use in direct relation to the equipment, plant, device or process by selecting a point on the model, which point is mappable via setpoints watchpoints or other data points to execute an instruction to retrieve technical information, provide additional information in the form of graphic information manipulatable by an operator to access, examine or carry out control actions for the equipment, plant, device or process.

* * * * *